Patented Jan. 23, 1945

2,367,931

UNITED STATES PATENT OFFICE 2,367,931

PROCESS IN THE MANUFACTURE OF YEAST

Marcel Celestin-Honoré Deloffre, Toorak, Victoria, Australia

No Drawing. Application September 2, 1941, Serial No. 409,313. In Australia January 22, 1941

8 Claims. (Cl. 195—94)

This invention relates to the manufacture of commercial yeast but is primarily concerned with a process for propagating yeast cells in the production of a commercial yeast that is particularly suitable for use by bakers.

Known processes for the manufacture of bakers' yeast involve propagation of yeast cells in yeast-nutrient solutions under aerating conditions, and comprise two distinct phases, namely, (a) the production of seed or mother yeast, and (b) the production of commercial or bakers' yeast therefrom.

In the production of the seed yeast, a culture is prepared from a yeast cell selected for use in the particular process and which will yield a final product having good fermentation power as well as keeping quality. The culture is usually developed in the laboratory and after several cultivations, the culture is transferred to a seed tank where the fermentation finishes with the production of seed yeast.

The yeast-nutrient solution in known processes for the development of the yeast cell is essentially composed of carbohydrate such as is obtained from grain, saccharified with malt or acid, syrup molasses (beet or cane) or dried grapes, but is usually saccharified grain or molasses or a mixture of both, the concentration of the yeast-nutrient solution or wort varying between 8° and 12° Balling.

Yields obtained after fermentation is complete, depend upon the concentration of the wort, degree of aeration and other variable conditions, but usually is approximately 20% to 30% of seed yeast relative to the weight of the raw material that provides the carbohydrate employed as the yeast-nutrient. In addition, alcohol is generally formed in a proportion equivalent to about 30% to 20% of the raw material.

Seed yeast so formed is separated from the nutrient wort by centrifugation or the like and is washed ready for further use, whilst the alcohol is either concentrated by distillation or is transformed into vinegar in any known manner.

In the second phase, the seed yeast, either in compressed or concentrated liquid form, is added to further yeast-nutrient or wort held in a fermenter vessel and the yeast propagated under aerating conditions by any one of several distinct operational techniques. The yeast nutrient or wort in the fermenter usually is more dilute in concentration than the nutrient employed for the cultivation of the seed yeast, the degree of aeration generally varying between 1000 and 1500 cubic meters of air per hour for each 100 hectoliters of wort liquor. After fermentation is complete, the yeast is separated from the wort liquor, for example, by centrifugation, washed and compressed into commercial or bakers' yeast.

In the production of bakers' yeast under aerating conditions, the yeast manufacturer endeavours to obtain in the fermenter vessel, a maximum propagation of seed yeast into commercial yeast together with a minimum formation of alcohol. Various processes are known for this purpose and the technique is based on the continuous, progressive or intermittent feeding of yeast-nutrient during the fermentation period. The rate of feeding the nutrient is regulated so as to reduce the formation of alcohol as far as is possible and thus obtain a maximum yield of yeast.

Alcohol is formed at the beginning of the fermentation (zymatic phase) in quantity more or less controlled by the method employed and, generally, does not exceed 10% to 12% by weight of the total quantity of raw material containing the carbohydrate nutrient for the yeast during the fermentation. Owing to the high dilution usually employed at the beginning of fermentation by these processes, the quantity of alcohol formed during the zymatic phase represents relatively only a small proportion of the total volume. Generally the alcohol is slowly reabsorbed or assimilated by the yeast, wholly or in part, in the latter stages of the fermentation, under uncontrolled conditions and the final yield of yeast varies according to this reabsorption or assimilation.

Large yields of commercial yeast, up to 100% by weight of the raw material employed as nutrient, can be obtained by known methods of conducting the yeast propagation process in the fermenter vessel, but the average yield of seed yeast and, in turn, commercial yeast, in proportion to the total raw material used, is reduced in proportion to the quantity of alcohol produced during the formation of the seed yeast.

Whilst the formation of alcohol is undesirable according to the most generally practised processes for the manufacture of commercial yeast, certain prior proposals have envisaged the use of an alcoholic wort for the propagation of the yeast cells, but these proposals have employed worts containing only a minor proportion of alcohol by volume and the process adopted has not utilized the alcohol as a yeast-nutrient, to the best advantage.

The primary object of the present invention is to provide a process for the propagation of yeast cells for the production of commercial yeast from seed yeast under aerating conditions and in which an alcoholic wort containing a substantial proportion of alcohol, is utilized as a propagating medium for the yeast, which process is economical, convenient and possesses many practical advantages over known processes of a similar type. In addition, the invention produces a commercial yeast having fermentation power equal to the best known bakers' yeast and has a keeping quality superior thereto.

Another object of the invention is to provide a process for the propagation of seed yeast from a culture yeast under such conditions that an alcoholic wort containing a substantial proportion of alcohol, is formed, which is then utilized for the continued propagation of the seed yeast, so produced, into commercial yeast; both of which steps are capable of being conducted in the same vessel to achieve a reduction in equipment and production costs, at the same time, obtaining excellent results in yields and quality of the yeast produced.

I have discovered that commercial yeast can be produced from yeast cells propagated by a process which comprises fermenting a yeast-nutrient alcoholic wort having an alcohol content within the range of 2% to 5% by volume and inoculated or sown with seed yeast, by aerating the wort and gradually adding a yeast-nutrient carbohydrate solution to the wort, the quantity of carbohydrate introduced into the wort being progressively increased with the propagation rate of the yeast and the assimilation of the alcohol, until the alcohol and the carbohydrate are substantially completely assimilated by the yeast.

The yeast nutrient alcoholic wort utilized by the invention can be obtained by working up a brewery or distillery residual alcoholic liquor to obtain a 2% to 5% alcoholic wort which can be introduced into a fermenter vessel, then inoculated or sown with an amount of seed yeast such that the weight of said alcohol is equivalent to 80% to 100% of the seed yeast, and fermented by aerating and gradually adding to the wort, a yeast-nutrient carbohydrate solution containing traces of mineral and organic substances necessary for the metabolism of the yeast cell, as well known in the art. The carbohydrate solution preferably is of a concentration such that the dilution of the wort at the commencement of the fermentation is between 1 to 7 and 1 to 15 and at the completion of the fermentation is between 1 to 11 and 1 to 15, with respect to the total quantity of raw material consisting of the carbohydrate and said alcohol calculated as carbohydrate, the quantity of carbohydrate introduced into the wort being progressively increased with the propagation rate of the yeast and the assimilation of the alcohol, until the alcohol and the carbohydrate are substantailly completely assimilated by the yeast.

Aeration of the alcoholic wort in the fermenter is preferably effected by injecting a volume of air within the range of 1000 to 1500 cubic meters per hour for each 100 hectoliters of wort, the fermentation generally requiring between 10 and 14 hours to complete, and preferably is carried out at a temperature of approximately 30° C.

Instead of employing residual or waste alcoholic liquors to provide the 2% to 5% alcoholic wort, I prefer for economic reasons, to prepare the wort by yeast fermentation. For this purpose a yeast-nutrient carbohydrate solution or wort having a dilution preferably between 1 to 7 and 1 to 10 and containing traces of mineral and organic substances essential for yeast metabolism, is inoculated with culture yeast and the wort fermented, as a primary phase of the process, by aerating until the carbohydrate is assimilated by the yeast to an extent that alcohol is formed, calculated as carbohydrate, representing between 85% and 95% by weight of the total carbohydrate in the wort, which will be found to represent an alcohol concentration within the range of 2% to 5%. In this phase the aeration preferably is effected by injecting air into the wort for a period of time within about 14 hours to 18 hours at the rate of approximately 25 cubic meters of air per hour for each 100 hectoliters of wort, the culture yeast propagating into seed yeast amounting to between 25% and 30% by weight of the raw material containing the carbohydrate, present in the wort and which is equivalent to between 15% and 18% by weight of the total raw material used throughout the process.

Fermentation of this alcoholic wort is then completed, as a secondary phase of the process, by increasing the aeration rate preferably within the range of 1000 to 1500 cubic meters of air per hour per 100 hectoliters of wort, for a period of time within about 10 hours to about 14 hours, and during this period, introducing further yeast nutrient into the aerated wort by the gradual addition of a carbohydrate solution, containing traces of mineral and organic substances as previously described. The concentration of the carbohydrate solution is such that the dilution of the wort at the commencement of the fermentation is between 1 to 7 and 1 to 15 and at the completion of the fermentation is between 1 to 10 and 1 to 15, with respect to the total quantity of raw material consisting of the carbohydrate, and said alcohol calculated as carbohydrate, the quantity of carbohydrate introduced into the wort progressively increasing with the propagation rate of the yeast, and the assimilation of the alcohol, until the alcohol and the additional carbohydrate are substantially completely assimilated by the yeast.

In the secondary phase of the process, the alcohol formed as a result of the primary fermentation phase, functions as a nutrient for the seed yeast, and at the commencement of the second phase, the quantity of alcohol present represents between 50% and 80% by weight of the total raw material utilized as a source of carbohydrate for the process; whilst the quantity of seed yeast present in the wort at that period, varies between 15% and 18% by weight of the total raw material used in both phases.

Contrary to the customary procedure in the art, where a very dilute wort is invariably employed at the start of the fermentation, the process of this invention operates throughout with a practically constant normal concentration, the dilution being within the range of between 1 to 11 and 1 to 15, although it can be operated over a range of 1 to 7 to 1 to 15. This condition is maintained in the second phase of the fermentation by the gradual addition of further yeast nutrient into the aerated wort, by pouring continuously or intermittently at a rate of flow as demanded by the progressive increase, by multiplication, in the propagation rate of the yeast.

Accordingly the present invention provides a process for the propagation of yeast cells that comprises two fundamentally distinct phases, the primary phase being characterized by the inoculation with culture yeast, of a carbohydrate yeast-nutrient wort, as a mass, and the fermentation of that mass under aerating conditions whereby the major proportion of the carbohydrate is converted into alcohol, the remaining proportion being assimilated by the yeast to permit propagation; the alcohol formed representing between 50% and 80% by weight of the total raw material utilized in the complete process (including the second phase), and the yeast propagating to between 15% and 18% by weight of such raw material. Whereas the second phase of the process is a reversal, to the extent that it is characterized by assimilation of the alcohol by the yeast, as a nutrient for its propagation, progressively and in conjunction with the assimilation of the additional carbohydrate yeast-nutrient solution that is gradually poured into the aerated alcoholic wort at a rate of flow determined by the propagation rate of the yeast during this phase, whereby the alcohol is substantially completely assimilated by the yeast.

However, in order that the invention may be better understood, the following examples set forth practical embodiments of the process, but it is to be understood that the invention is not limited to the details contained therein.

*Example 1*

A yeast nutrient wort of 5000 lbs. of beet molasses was prepared in a manner well known in the art, including clarification of the wort and addition of mineral salts essential for the propagation of yeast cells. The wort was then introduced into a culture tank of the completely enclosed type, together with water, the mass boiled to sterilize, and cooled down to 30° C., the final volume amounting to about 210 hectoliters. Five to ten pounds of selected culture yeast were then inoculated or sown in the wort and aerobic fermentation of the mass effected by the injection of air, sterilized by filtration in known manner, at the rate of approximately 25 cubic meters of sterile air/100 hectoliters of wort/hour for a period of about 16–17 hours.

The primary phase of the process concluded at the end of the 16–17 hours aeration and an assay of the fermented wort disclosed that seed yeast had been propagated to 28.5 grams/liter, while alcohol amounting to 3.143% by volume had been formed by the yeast, in the wort, showing that 87% of the total sugar in the culture tank had been converted into alcohol. The alcoholic wort containing the seed yeast was then transferred to a fermenter vessel and water added to increase the volume to 315 hectoliters.

For the second phase of the process, 3600 lbs. of wheat were saccharified with, for example, hydrochloric acid, and, after saccharification, clarified by filtration, mineral salts added, and the solution stored in a concentrated form in feed tanks. This solution was then diluted with water to a concentration corresponding to about 1 to 13, and, over a period of about 12 hours, gradually poured into the alcoholic wort in the fermenter vessel, during which time the wort was aerated by the injection of between 1000 to 1500 cubic meters of sterile air/100 hectoliters of wort/hour. The rate of flow of the carbohydrate solution into the aerated wort was determined by and progressively increased with, the propagation rate, by multiplication, of the yeast.

During the 12 hours period of this phase, the alcohol formed in the primary phase, was gradually assimilated by the yeast, conjointly with the carbohydrate solution gradually added to the aerated wort, and, at the conclusion of that period, tests showed that the alcohol and the additional carbohydrate had been substantially completely assimilated by the yeast. This phase of the fermentation is readily apparent from the following data in which the alcoholic wort containing the seed yeast, was transferred to the fermenter vessel by pumping, which commenced at 6 a. m., and was completed by 7:30 a. m., when aeration of the wort at the rate of between 1000 to 1500 cubic meters of sterile air/100 hectoliters of wort/hour then began, together with the gradual addition of the carbohydrate solution.

| Time, hours | Total volume | Alcohol content | Alcohol assimilated | Yeast produced | Dilution of wort |
|---|---|---|---|---|---|
| | Hectoliters | Liters | Liters | Pounds | |
| 7.30 a. m | 315 | 660 | | 1,324 | 13.4 |
| 9 | | 628 | 32 | 1,415 | |
| 10 | | 587 | 41 | 1,590 | |
| 12 noon | 347 | 477 | 110 | 2,530 | 13.2 |
| 2 | | 353 | 124 | 4,140 | |
| 4 | 417 | 190 | 163 | 5,872 | 12.8 |
| 6 | | 15 | 175 | 7,594 | |
| 7.30 | | Nil | 15 | 8,223 | 12.4 |

The yeast produced by the process of the invention was then separated from the wort liquor by centrifugation or the like, thoroughly washed and compressed into a form suitable for distribution as commercial or bakers' yeast.

*Example 2*

From a total charge consisting of 9000 lbs. of beet molasses, for the primary phase of the process according to this example, 6000 lbs. of the molasses was converted into a yeast nutrient wort by clarification and sterilization as described in Example 1. This wort was introduced into a culture tank of the completely enclosed type, together with water, sterilized and cooled to 30° C., the final volume being 225 hectoliters. Ten pounds of selected culture yeast were then inoculated or sown in the wort and the mass fermented by the injection of 25 cubic meters of sterile air/100 hectoliters of wort/hour for a period of about 18 hours.

At the end of this period, which marked the conclusion of the primary phase, the wort contained alcohol at a concentration of 3.66% by volume, showing that 90% of the total sugar in the culture-tank had been transformed into alcohol, whilst yeast had propagated to 30 grams/liter. This alcoholic wort was then pumped into a fermenter vessel and water added to bring the volume of the mass to 315 hectoliters.

The remaining 3000 lbs. of molasses was then converted into a yeast-nutrient carbohydrate solution and utilized for the second phase of the process, by clarification and sterilization as described, the solution being stored in concentrated form in feed tanks. This solution was then diluted with water to a concentration corresponding to about 1 to 12, and, over a period of 12 hours 20 minutes, gradually poured into the alcoholic wort held in the fermenter vessel, the wort being aerated throughout this period of time by the injection of between 1000 to 1500 cubic meters of sterile air/100 hecoliters of wort/hour. The rate of flow of the carbohydrate solution into the aerated wort progressively increased with the propagation rate, by multiplication, of the yeast and at the conclusion of the fermentation period specified, tests showed that the alcohol and the additional carbohydrate had been substantially completely assimilated by the yeast.

The following data clearly illustrates the technical details of this phase of the fermentation, in which pumping of the alcoholic wort to the fermenter vessel commenced at 6 a. m. and was completed at 7.40 a. m. when aeration at the rate specified then began, together with the gradual addition of the carbohydrate solution.

| Time, hours | Total volume | Alcohol content | Alcohol assimilated | Yeast produced | Dilution of wort |
|---|---|---|---|---|---|
|  | Hectoliters | Liters | Liters | Pounds |  |
| 7.45 a. m. | 315 | 823 | -------- | 1,490 | 11.25 |
| 9 | -------- | 780 | 43 | 1,575 | -------- |
| 11 | -------- | 736 | 44 | 2,354 | -------- |
| 1 p. m. | 352 | 584 | 152 | 3,415 | 11.3 |
| 3 | -------- | 385 | 199 | 4,913 | -------- |
| 5 | 425 | 192 | 193 | 6,453 | 11.5 |
| 7 | -------- | 11 | 181 | 7,847 | -------- |
| 8 | 488 | Nil | 11 | 8,133 | 11.9 |

The yeast so produced was then separated from the wort liquor by centrifugation or the like, thoroughly washed and compressed into a form suitable for distribution as commercial or bakers' yeast.

These examples clearly show the propagation rate of the yeast, which takes place with the assimilation of the alcohol present in the wort, concurrently with the assimilation of the carbohydrate in the yeast-nutrient carbohydrate solution gradually introduced into the aerated wort during this phase. Thus, in Example 1, can be seen the assimilation rate of the alcohol concurrently with the periodic increase in total volume, the first 4½ hours amounting to an average rate of addition of carbohydrate solution (concentration of 1:13) of about 7.5 hectoliters/hour; the next 4 hours showing an average rate of addition of 17.5 hectoliters/hour; and the last 3½ hours of this phase showing an average rate of 20 hectoliters/hour. Whilst, in Example 2, the alcohol assimilation rate can be aligned with a periodic increase in volume, by addition of the carbohydrate solution, at an average rate of addition in the first 5¼ hours of about 7 hectoliters/hour; in the next 4 hours of 18.25 hectoliters/hour; and in the final 3 hours of this phase of 21 hectoliters/hour.

The invention thus provides a process for the propagation of yeast cells by utilizing a substantial proportion of alcohol as yeast nutrient, the alcohol being assimilated in the course of the yeast cell metabolism by the action of yeast enzymes. The assimilation of the alcohol in the process is proportional to the enzymatic activity of the yeast, the speed of which is independent of alcohol concentration and varies only with concentration of yeast enzymes. The quantity of alcohol assimilated is proportional to the quantity of enzymes/time as expressed in the formula:

$$\frac{C_E \times C_S}{T}$$

where $C_E$ = the concentration of enzymes; $C_S$ = per cent sugar present with respect to alcohol; and $T$ = time.

While the examples of the invention describe the use of a culture tank and a separate fermenter vessel, it will be understood that the production of the seed yeast-alcoholic wort and the fermentation of this mass to produce commercial yeast can both be carried out in a single fermenter vessel, provided such vessel has sealing means for use during the primary phase of the process when the culture yeast is propagated to seed yeast, and can then be opened for the fermentation according to the second phase. This arrangement can be effected with only slight variations in the process and thus reduces the number of fermentation vessels required, as well as production costs, by eliminating undue handling of the wort, over a given period of time.

I claim:

1. A process for propagating yeast cells for the production of commercial yeast, which comprises fermenting a yeast nutrient alcoholic wort having an alcohol content within the range of 2% to 5% by volume and inoculated with seed yeast by aerating the wort and gradually adding a yeast nutrient carbohydrate solution to the wort, the quantity of carbohydrate introduced into the wort being progressively increased with the propagation rate of the yeast and the assimilation of the alcohol, until the alcohol and carbohydrate are substantially completely assimilated by the yeast.

2. A process for propagating yeast cells for the production of commercial yeast which comprises fermenting a yeast nutrient alcoholic wort having an alcohol content within the range of 2% to 5% by volume, by inoculating the wort with an amount of seed yeast such that the weight of said alcohol is equivalent to 80% to 100% of the seed yeast, aerating the wort and gradually adding a yeast nutrient carbohydrate solution to the wort, the quantity of carbohydrate introduced into the wort being progressively increased with the propagation rate of the yeast and the assimilation of the alcohol, until the alcohol and carbohydrate are substantially completely assimilated by the yeast.

3. A process for propagating yeast cells for the production of commercial yeast which comprises fermenting a yeast nutrient alcoholic wort having an alcohol content within the range of 2% to 5% by volume, by inoculating the wort with an amount of seed yeast, such that the weight of said alcohol is equivalent to 80% to 100% of the seed yeast, aerating the wort and gradually adding to the wort a yeast nutrient carbohydrate solution having a concentration such that the dilution of the wort at the commencement of the fermentation is between 1 to 7 and 1 to 15, and at the completion of the fermentation is between 1 to 11 and 1 to 15 with respect to the total quantity of raw material, consisting of the carbohydrate and said alcohol, calculated as carbohydrate, the quantity of carbohydrate introduced into the wort being progressively increased with the propagation rate of the yeast and the assimilation of the alcohol, until the alcohol and the carbohydrate are substantially completely assimilated by the yeast.

4. A process for propagating yeast cells for the production of commercial yeast which comprises fermenting a yeast nutrient alcoholic wort having an alcohol content within the range of 2% to 5% by volume, by inoculating the wort with an amount of seed yeast such that the weight of said alcohol is equivalent to 80% to 100% of the seed yeast, aerating the wort for a period of time within 10 to 14 hours with a volume of air within the range of 1,000 to 1,500 cubic meters/100 hectoliters of wort/hour, and gradually adding to the wort which is maintained at a temperature of approximately 30° C., during this period a yeast nutrient carbohydrate solution having a concentration such that the dilution of the wort at the commencement of the fermentation is between 1 to 7 and 1 to 15, and at the completion of the fermentation is between 1 to 11 and 1 to 15 with respect to the total quantity of raw material consisting of the carbohydrate, and said alcohol calculated as carbohydrate, the quantity of carbohydrate introduced into the wort being progressively increased with the propagation rate of the yeast, and the assimilation of the alcohol, until the alcohol and the carbohydrate are substantially completely assimilated by the yeast.

5. A process for propagating yeast cells for the production of commercial yeast which comprises inoculating a yeast nutrient carbohydrate wort with culture yeast, fermenting the inoculated wort by aerating until the carbohydrate is assimilated by the yeast to an extent that alcohol calculated as carbohydrate is formed representing between 85% and 95% by weight of the carbohydrate in the wort, and introducing further yeast nutrient into the aerated wort by the gradual addition of a carbohydrate solution, the quantity of carbohydrate thus introduced into the wort being progressively increased with the propagation rate of the yeast and the assimilation of the alcohol, until the alcohol and the carbohydrate are substantially completely assimilated by the yeast.

6. A process for propagating yeast cells for the production of commercial yeast, which comprises inoculating a yeast nutrient carbohydrate wort with culture yeast, fermenting the inoculated wort by aerating until the carbohydrate is assimilated by the yeast to an extent that alcohol calculated as carbohydrate is formed representing between 85% and 95% by weight of the carbohydrate in the wort and that the culture yeast propagates to between 15% and 18% by weight of the total raw material used throughout the process, and introducing further yeast nutrient into the aerated wort by the gradual addition of a carbohydrate solution, the quantity of carbohydrate thus introduced into the wort being progressively increased with the propagation rate of the yeast and the assimilation of the alcohol, until the alcohol and the carbohydrate are substantially completely assimilated by the yeast.

7. A process for propagating yeast cells for the production of commercial yeast which comprises inoculating a yeast nutrient carbohydrate wort with culture yeast, fermenting the inoculated wort by aerating until the carbohydrate is assimilated by the yeast to an extent that alcohol calculated as carbohydrate is formed representing between 85% and 95% by weight of the carbohydrate and that the culture yeast propagates to between 15% and 18% by weight of the total raw material used throughout the process, and introducing further yeast nutrient into the aerated wort by the gradual addition of a carbohydrate solution having a concentration such that the dilution of the wort at the commencement of the fermentation is between 1 to 7 and 1 to 15, and at the completion of the fermentation is between 1 to 11 and 1 to 15 with respect to the total quantity of raw material consisting of the carbohydrate and said alcohol calculated as carbohydrate, the quantity of carbohydrate introduced into the wort being progressively increased with the propagation rate of the yeast, and the assimilation of the alcohol, until the alcohol and the carbohydrate are substantially completely assimilated by the yeast.

8. A process for propagating yeast cells for the production of commercial yeast which comprises inoculating with culture yeast, a yeast-nutrient carbohydrate wort at a temperature of approximately 30° C. and having a concentration corresponding to a dilution of between 1 to 7 and 1 to 10, fermenting the inoculated wort by aerating until the carbohydrate is assimilated by the yeast to an extent that alcohol calculated as carbohydrate is formed representing between 85% and 95% by weight of the carbohydrate and that the culture yeast propagates to between 15% and 18% by weight of the total raw material used throughout the process, and introducing further yeast nutrient into the aerated wort by the gradual addition of a carbohydrate solution having a concentration such that the dilution of the wort at the commencement of the fermentation is between 1 to 7 and 1 to 15 and at the completion of the fermentation is between 1 to 11 and 1 to 15, with respect to the total quantity of raw material consisting of the carbohydrate and said alcohol calculated as carbohydrate, the quantity of carbohydrate introduced into the wort being progressively increased with the propagation rate of the yeast and the assimilation of the alcohol, until the alcohol and the carbohydrate are substantially completely assimilated by the yeast.

MARCEL CELESTIN-HONORÉ DELOFFRE.